United States Patent [19]

Sawae et al.

[11] Patent Number: 5,666,449
[45] Date of Patent: Sep. 9, 1997

[54] OPTICAL WAVEGUIDE DEVICE

[75] Inventors: Shinya Sawae, Sapporo; Sadayuki Miyata; Takashi Yamane, both of Kawasaki, all of Japan

[73] Assignee: Fujitsu Limited, Kawasaki, Japan

[21] Appl. No.: 717,817

[22] Filed: Sep. 24, 1996

[30] Foreign Application Priority Data

Feb. 19, 1996 [JP] Japan .................................. 8-030498

[51] Int. Cl.⁶ .................................................. G02B 6/30
[52] U.S. Cl. .................................................. 385/49
[58] Field of Search ........................... 385/88–94, 49

[56] References Cited

U.S. PATENT DOCUMENTS

| | | | |
|---|---|---|---|
| 4,199,222 | 4/1980 | Ikushima et al. | 385/49 |
| 5,388,172 | 2/1995 | Anderson | 385/49 |

*Primary Examiner*—John Ngo
*Attorney, Agent, or Firm*—Staas & Halsey

[57] ABSTRACT

An optical waveguide device having an optical waveguide chip, first and second adapters, and an optical fiber plug. The optical waveguide chip has an optical waveguide structure having a connection end, and an end surface of the chip is flush with the connection end. The first adapter is fixed to the chip, and has an outer surface set in predetermined positional relation with the connection end. The second adapter has an inner surface including a first region and a second region, and is detachably mounted to the first adapter so that the outer surface of the first adapter comes to close contact with the first region. The optical fiber plug has an optical fiber having an excitation end and a ferrule in which the optical fiber is inserted and fixed. The optical fiber plug is detachably mounted to the second adapter so that the outer surface of the ferrule comes to close contact with the second region. When the second adapter is mounted to the first adapter, and the optical fiber plug is mounted to the second adapter, the connection end of the optical waveguide structure of the chip and the excitation end of the optical fiber are optically coupled.

11 Claims, 12 Drawing Sheets

OPTICAL WAVEGUIDE DEVICE

BACKGROUND OF THE INVENTION

1. Field of the Invention

The present invention relates generally to an optical waveguide device having an optical waveguide chip, and more particularly to a connection structure between an optical waveguide chip and an optical fiber in such an optical waveguide device.

2. Description of the Related Art

In recent years, an optical waveguide chip having an optical waveguide structure has been widely developed to be put to practical use. In incorporating the optical waveguide chip into a system, optical connection between an optical fiber as a transmission line and the optical waveguide chip is indispensable, and a structural improvement of the optical connection has now been desired.

Conventionally, an optical waveguide device constructed by connecting an optical waveguide chip and an optical fiber by an adhesive is known. The optical waveguide chip has an optical waveguide structure. The optical waveguide chip and the optical fiber are fixed to each other so that a connection end corresponding to an end surface of the optical waveguide structure and an excitation end of the optical fiber are opposed to each other in close contact.

Also known is another optical waveguide device including an optical waveguide chip, a first optical fiber for connection, and a second optical fiber as a transmission line. The first optical fiber has first and second excitation ends. The optical waveguide chip and the first optical fiber are accommodated in a housing, and a connection end of the optical waveguide chip and the first excitation end of the first optical fiber are connected together by an adhesive. The second excitation end of the first optical fiber accommodated in the housing is detachably connected to an excitation end of the second optical fiber by an optical connector structure.

In these conventional optical waveguide devices, the connection end of the optical waveguide chip and the excitation end of the optical fiber (the first excitation end of the first optical fiber) must be connected together by the adhesive. Accordingly, a complicated operation for positioning or the like is required, so that optical connection between the optical waveguide chip and the optical fiber (the first optical fiber) is not simple.

Particularly in the latter conventional optical waveguide device, two connection points are present between the optical waveguide chip and the second optical fiber as the transmission line, causing an increase in connection loss.

SUMMARY OF THE INVENTION

It is therefore an object of the present invention to provide an optical waveguide device which can optically couple an optical waveguide chip and an optical fiber simply with low connection loss.

In accordance with an aspect of the present invention, there is provided an optical waveguide device having an optical waveguide chip, first and second adapters, and an optical fiber plug. The optical waveguide chip has an optical waveguide structure having a connection end, and an end surface of the chip is flush with the connection end. The first adapter is fixed to the chip, and has an outer surface set in predetermined positional relation with the connection end. The second adapter has an inner surface including a first region and a second region, and is detachably mounted to the first adapter so that the outer surface of the first adapter comes to close contact with the first region. The optical fiber plug has an optical fiber having an excitation end and a ferrule in which the optical fiber is inserted and fixed. The optical fiber plug is detachably mounted to the second adapter so that the outer surface of the ferrule comes to close contact with the second region. When the second adapter is mounted to the first adapter, and the optical fiber plug is mounted to the second adapter, the connection end of the optical waveguide structure of the chip and the excitation end of the optical fiber are optically coupled.

In the optical waveguide device of the present invention, the optical waveguide chip and the optical fiber are connected by using the first and second adapters each having a specific structure. Accordingly, optical coupling between the optical waveguide chip and the optical fiber can be greatly simplified. Further, since the optical waveguide chip and the optical fiber are directly coupled at one connection point, connection loss can be reduced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
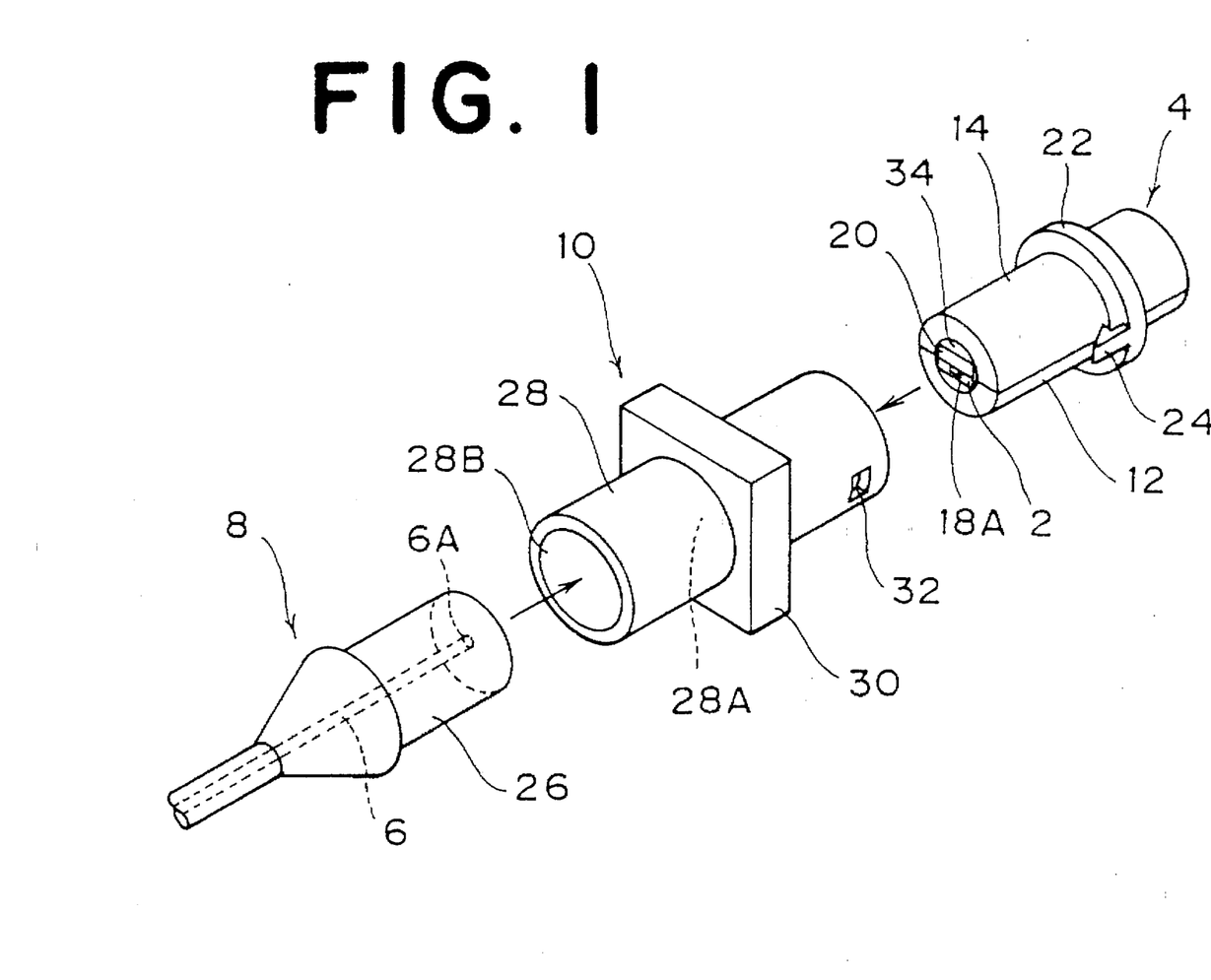
FIG. 1 is a perspective view of an optical waveguide device showing a first preferred embodiment of the present invention.

FIG. 1 is a perspective view of an optical waveguide device showing a first preferred embodiment of the present invention. The optical waveguide device includes a chip module 4 having an optical waveguide chip 2, an optical fiber plug 8 having an optical fiber 6, and an adapter 10 for detachably connecting the chip module 4 and the optical fiber plug 8.

Figure 2:
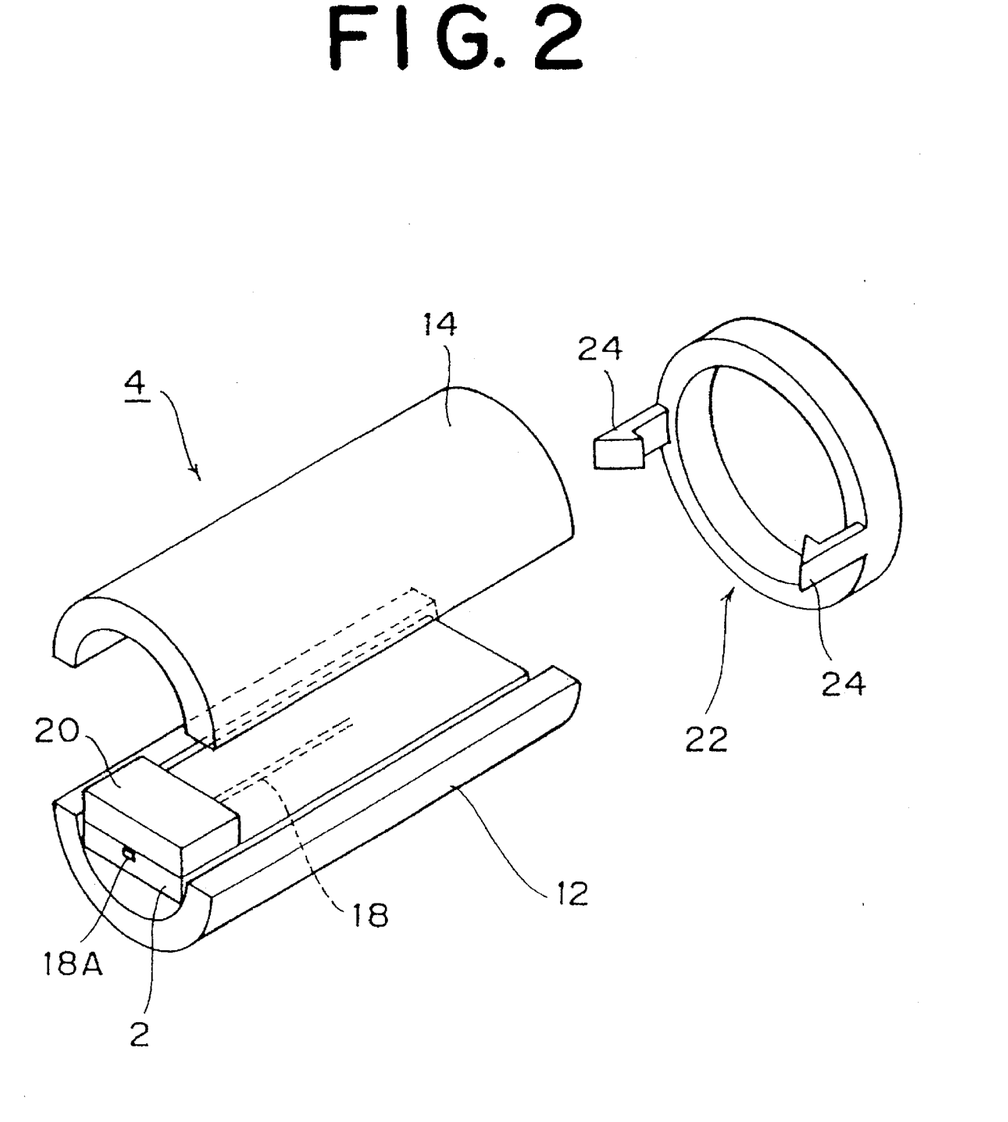
FIG. 2 is an exploded perspective view of a chip module in the first preferred embodiment.

Referring to FIG. 2, there is shown an exploded perspective view of the chip module 4 shown in FIG. 1. A pair of ferrule-like half members 12 and 14 formed by equally dividing a cylindrical block (sleeve) into two parts are used to retain the optical waveguide chip 2 in an inside space defined therebetween. The optical waveguide chip 2 has a rectangular prismatic shape, and the two longer sides of the lower surface thereof are seated on the inner surface of the half member 12. The optical waveguide chip 2 has an optical waveguide structure 18 having a connection end (end surface) 18A, and the connection end 18A is flush with an end surface of the chip 2. A subplate 20 having a rectangular prismatic shape is fixed to the upper surface of the chip 2 in the vicinity of the connection end 18A so as to cover the optical waveguide structure 18. The subplate 20 functions to determine the position of the chip 2 in such a manner that when the half member 14 is fixed to the half member 12 to be integrated together, the two sides of the upper surface of the subplate 20 parallel to the two longer sides of the lower surface of the chip 2 come to contact with the inner surface of the half member 14. The half members 12 and 14 are fabricated so that when they are integrated together, the outer surfaces thereof form one cylindrical surface. The integrated half members 12 and 14 are inserted through a flange 22 and fixed thereto. The flange 22 has a pair of hooks 24 projecting toward the connection end 18A of the optical waveguide structure 18.

Referring again to FIG. 1, the optical fiber 6 is inserted in a central thin hole of a ferrule 26 and fixed therein. An end surface (excitation end) 6A of the optical fiber 6 and an end surface of the ferrule 26 are polished to a plane surface or a substantially spherical surface. The outer surface of the ferrule 26 is cylindrical. The adapter 10 has a sleeve (receptacle) 28 and a flange 30 projecting radially outward from the sleeve 28 at a substantially central position in the longitudinal direction of the sleeve 28. The inner surface of the sleeve 28 includes a first region 28A corresponding to the chip module 4 and a second region 28B corresponding to the optical fiber plug 8. Reference numerals 32 denote a pair of openings for engaging the pair of hooks 24 of the flange 22 of the chip module 4 (one of the pair of openings 32 being shown). Reference numeral 34 denotes an adhesive charged in the space between the half members 12 and 14 and exposed to an end surface of the chip module 4.

The cylindrical 6 outer surface of the integrated half members 12 and 14 of the chip module 4 has a diameter such that when the chip module 4 is mounted to the adapter 10, the cylindrical outer surface of the integrated half members 12 and 14 comes to close contact with the first region 28A, that is, a diameter slightly smaller than the diameter of the inner surface of the sleeve 28. Further, the cylindrical outer surface of the ferrule 26 has a diameter such that when the optical fiber plug 8 is mounted to the adapter 10 from the side opposite to the chip module 4, the cylindrical outer surface of the ferrule 26 comes to close contact with the second region 28B. Further, the sizes of the chip module 4, the optical fiber plug 8, and the adapter 10 are set so that when the adapter 10 is mounted to the chip module 4, and the optical fiber plug 8 is mounted to the adapter 10, the connection end 18A of the chip module 4 and the excitation end 6A of the optical fiber 6 come to opposition to and close contact with each other.

Figure 3:
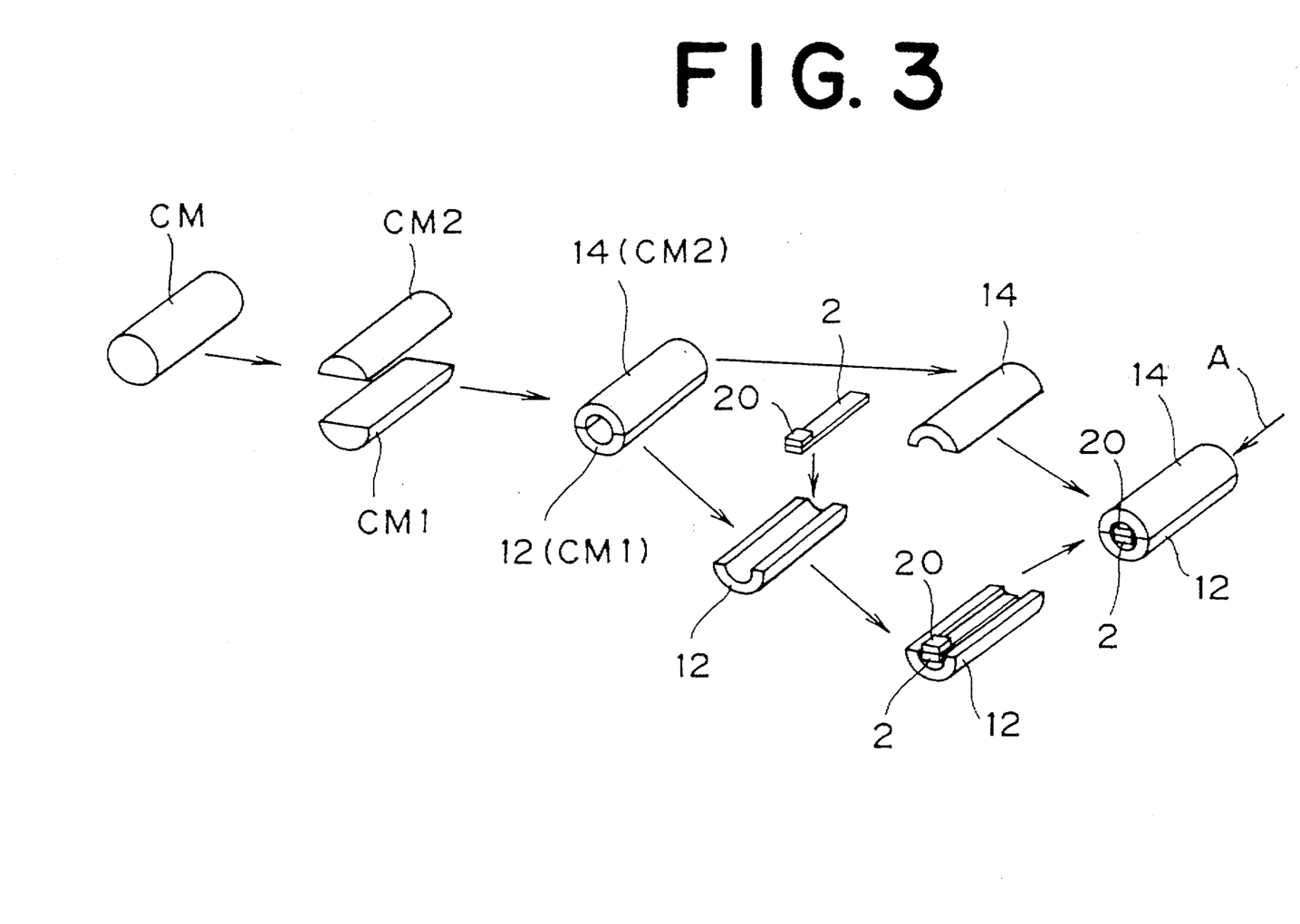
FIG. 3 is a view showing a fabrication process for the chip module in the first preferred embodiment.

Referring to FIG. 3, there is shown a fabrication process for the chip module 4 in the first preferred embodiment. First, a solid cylindrical member CM prepared with a high dimensional accuracy is equally divided along a plane containing the center axis of the member CM to obtain a pair of half members CM1 and CM2. Then, the half members CM1 and CM2 are cut away at their divided surfaces to form a pair of semicylindrical grooves (inner surfaces) concentrical with the outer surfaces of the half members CM1 and CM2, thus forming the half members 12 and 14 shown in FIG. 2.

On the other hand, the subplate 20 is preliminarily fixed to the optical waveguide chip 2. The optical waveguide chip 2 integrated with the subplate 20 is positioned to be seated on the inner surface of the half member 12. Then, the half members 12 and 14 are integrated. At this time, the two longer sides of the lower surface of the optical waveguide chip 2 come to contact with the inner surface of the half member 12, and the two sides of the upper surface of the subplate 20 parallel to the two longer sides of the lower surface of the chip 2 come to contact with the inner surface of the half member 14. Accordingly, the optical waveguide chip 2 and the connection end 18A (see FIG. 2) are determined in position with respect to the outer surfaces of the half members 12 and 14. In this condition, an adhesive is charged into the space defined between the half members 12 and 14 from the side opposite to the subplate 20, thereby hermetically sealing the optical waveguide chip 2 and mutually fixing all the components of the chip module 4. After the adhesive has been cured, the end surfaces of the half members 12 and 14 and the optical waveguide chip 2 are polished to allow the connection end 18A of the optical waveguide structure 18 flush with the end surface of the optical waveguide chip 2. The half members 12 and 14 may be further fixed together by laser welding to thereby enhance a fixing strength therebetween.

According to this preferred embodiment as described above, the optical waveguide chip 2 is accommodated inside the integrated half members 12 and 14 (first adapter). Accordingly, the optical waveguide chip 2 can be easily hermetically sealed by charging the adhesive into the integrated half members 12 and 14. That is, in the case where a chip is fixed on a substrate as in the prior art, the chip cannot be easily hermetically sealed because of a low viscosity of an optical adhesive. In contrast, according to this preferred embodiment, the adhesive hardly flows out of the inside of the integrated half members 12 and 14, so that the hermetic sealing of the chip 2 can be easily performed. Further, since the chip module 4 and the optical fiber plug 8 are connected by using the adapter 10 (second adapter) as shown in FIG. 1, direct coupling of the connection end 18A and the excitation end 6A can be simply performed.

Figure 4:
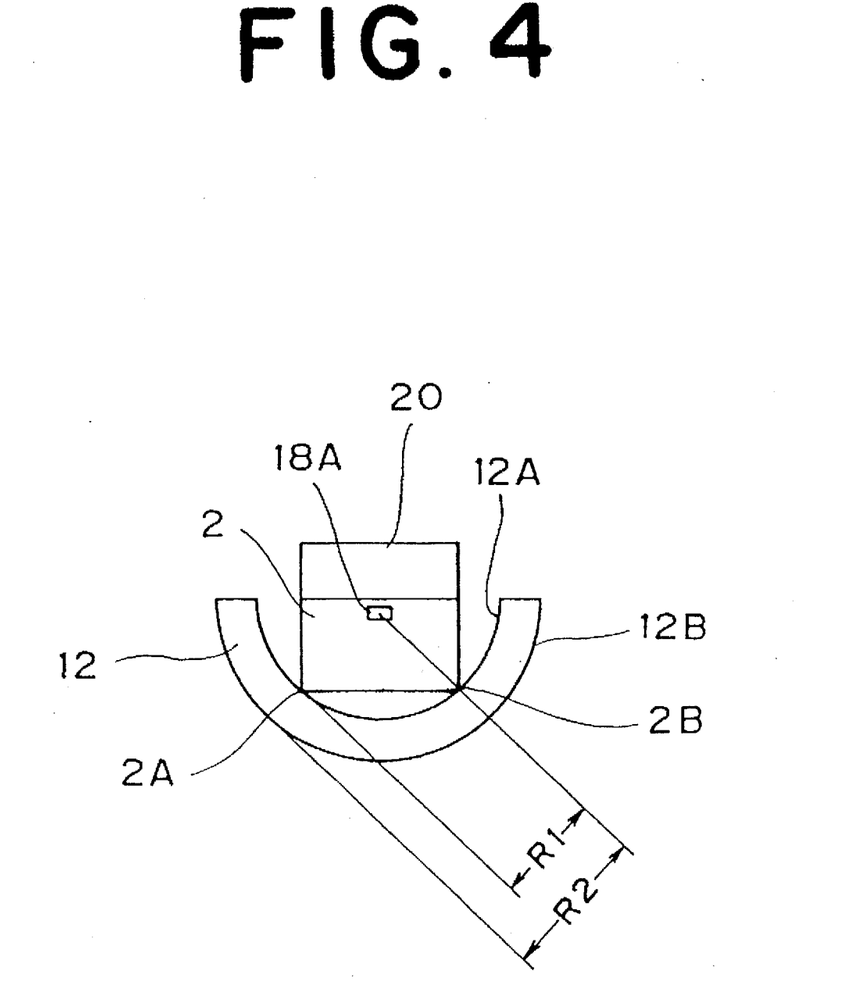
FIG. 4 is a view illustrating position setting of a connection end in the first preferred embodiment.

Referring to FIG. 4, there is shown a view illustrating position setting of the connection end 18A in the first preferred embodiment. Reference numeral 12A denotes the groove forming the inner surface of the half member 12 described with reference to FIG. 3, and reference numeral 12B denotes the outer surface of the half member 12. In this preferred embodiment, the distance from the center of the connection end 18A to each of two sides 2A and 2B of the lower surface of the optical waveguide chip 2 is set equal to the radius of curvature (R1) of the inner surface 12A of the half member 12. With this setting, the connection end 18A can be positioned at the center of the cylinder formed by the outer surface of the integrated half members 12 and 14. In this case, the distance R2 from the center of the connection end 18A to the outer surface 12B of the half member 12 becomes equal to the sum of the distance R1 and the thickness of the half member 12, namely, this sum is equal to the radius of curvature of the cylindrical outer surface of the integrated half members 12 and 14. By setting the position of the connection end 18A in this manner, the connection end 18A in the chip module 4 and the excitation end 6A in the optical fiber plug 8 can be easily opposed to each other at the same position as shown in FIG. 1.

In the ferrule 26 of the optical fiber plug 8, the central thin hole therein can be positioned with respect to the outer surface of the ferrule 26 on the order of submicrons. Further, in the chip module 4, the connection end 18A can be positioned with respect to the outer surface of the integrated half members 12 and 14 on the order of submicrons. Accordingly, the excitation end 6A and the connection end 18A can be accurately opposed to each other only by inserting the optical fiber plug 8 and the chip module 4 into the adapter 10. The reason why such high-accuracy positioning in the chip module 4 is attainable is that a technique of working the outer surfaces and the inner surfaces of the half members 12 and 14 has been established like that in the ferrule 26, and that a high-accuracy working technique for the optical waveguide chip 2 and the subplate 20 has also been established. Thus, according to this preferred embodiment, the optical waveguide chip 2 and the optical fiber 6 can be optically coupled simply with low connection loss.

Figure 5:
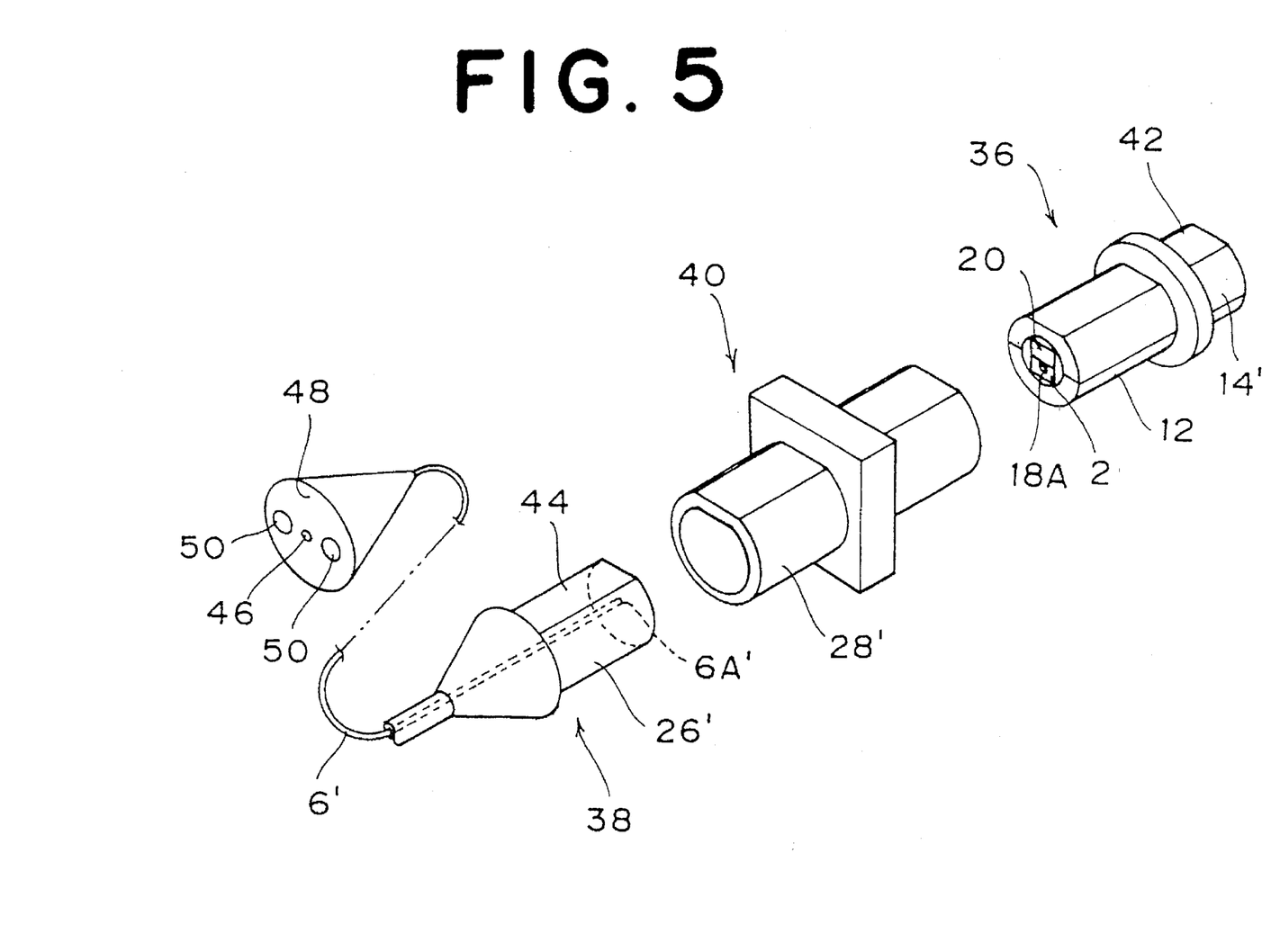
FIG. 5 is a perspective view of an optical waveguide device showing a second preferred embodiment of the present invention.

FIG. 5 is a perspective view of an optical waveguide device showing a second preferred embodiment of the present invention. The optical waveguide device shown in FIG. 5 includes a chip module 36, an optical fiber plug 38, and an adapter 40 respectively corresponding to the members 4, 8, and 10 in the first preferred embodiment shown in FIG. 1. In contrast with the chip module 4 in the first preferred embodiment, the chip module 36 is characterized in that a half member 14' has a flat surface 42 parallel to the upper surface of an optical waveguide chip 2. A polarization plane of linearly polarized light to be guided by the optical waveguide chip 2 is parallel or perpendicular to the upper surface of the chip 2, so that the polarization plane is parallel or perpendicular to the flat surface 42. The flat surface 42 is parallel also to a bonded surface between a half member 12 and the half member 14'.

The adapter 40 has a sleeve 28' having a shape corresponding to the shape of the integrated half members 12 and 14' (first adapter) of the chip module 36. That is, when the chip module 36 is inserted into the adapter 40, the outer surface of the integrated half members 12 and 14' comes into close contact with the inner surface of the sleeve 28'. Accordingly, a rotational (circumferential) position of the chip module 36 relative to the adapter 40 can be fixed.

The optical fiber plug 38 includes a ferrule 26' having a flat surface 44 so as to correspond to the shapes of the chip module 36 and the adapter 40. Accordingly, a rotational (circumferential) position of the optical fiber plug 38 relative to the adapter 40 can be fixed. A polarization-maintaining fiber (PMF) 6' is inserted and fixed in a central thin hole of the ferrule 26', and an excitation end 6A' of the PMF 6' and an end surface of the ferrule 26' are polished to a plane or a spherical surface. For example, the PMF 6' has a core 46 having a high refractive index, a clad 48 having a low refractive index for covering the core 46, and a pair of stress applying portions 50 located in symmetry with respect to the core 46 to apply a stress to the core 46. Accordingly, the PMF 6' can transmit linearly polarized light having a polarization plane parallel or perpendicular to the principal axis of the PMF 6' and maintain the polarization plane. The principal axis of the PMF 6' is set parallel or perpendicular to the flat surface 44 of the ferrule 26'.

According to this preferred embodiment, when the optical fiber plug 38 and the chip module 36 are mounted to the adapter 40, the polarization plane maintained by the PMF 6' can be made coincident with a polarization plane of light output from the connection end 18A in the optical waveguide chip 2 or a polarization plane of light to be input into the connection end 18A. Further, as similar to the first preferred embodiment, the chip 2 and the PMF 6' can be optically coupled simply with low connection loss.

Figure 6:
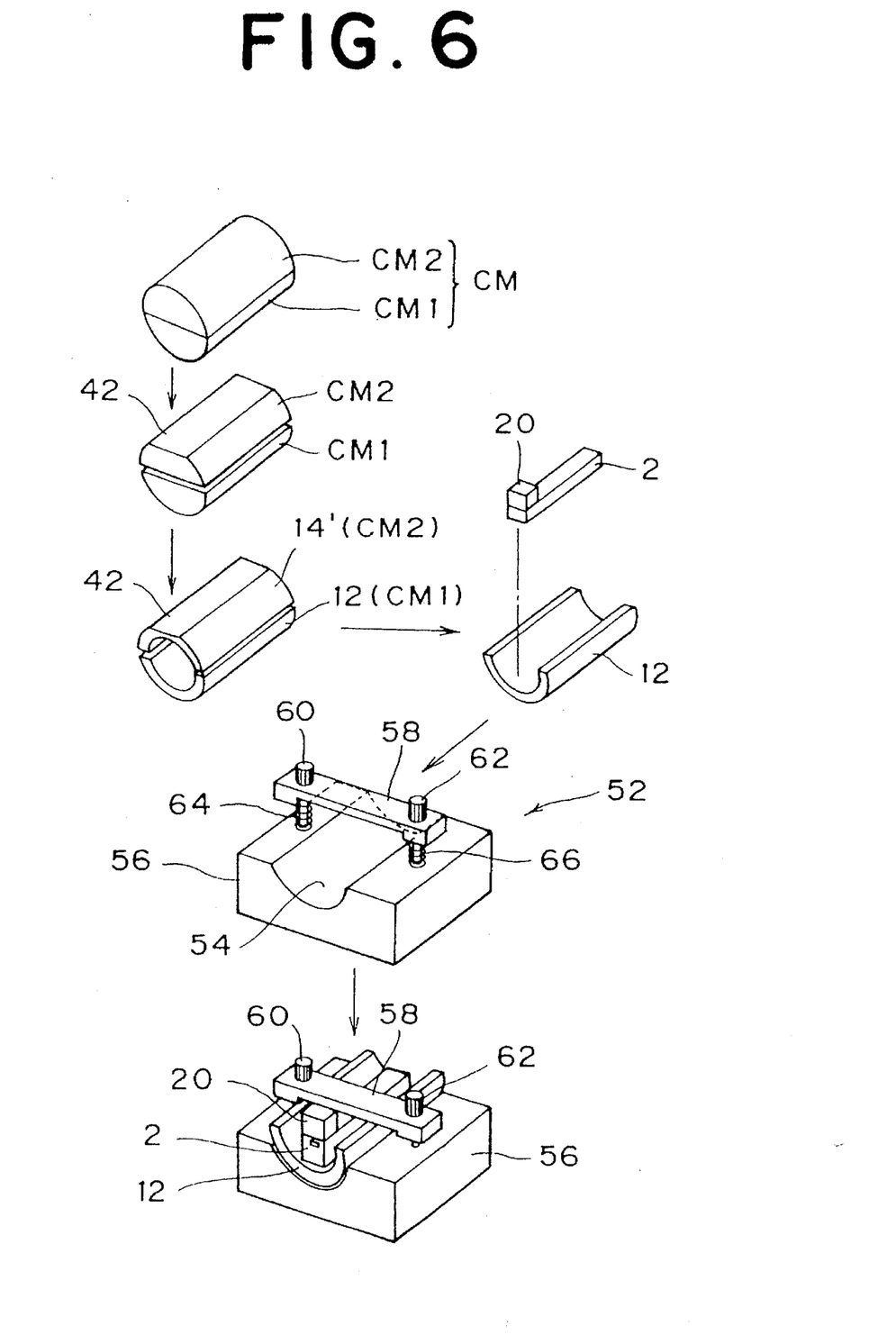
FIG. 6 is a view showing a fabrication process for a chip module in the second preferred embodiment.

Referring to FIG. 6, there is shown a fabrication process for the chip module 36 shown in FIG. 5. First, a solid cylindrical member CM prepared with a high dimensional accuracy is equally divided to obtain a pair of half members CM1 and CM2. Then, a cylindrical portion of the half member CM2 is cut away in parallel to a divided surface to form the flat surface 42. Then, the divided surface of the half member CM1 is cut away to form a semicylindrical groove (inner surface) concentrical with the outer surface of the half member CM1, thus forming the half member 12. Similarly, the divided surface of the half member CM2 is cut away to form a semicylindrical groove (inner surface) concentrical with the outer surface of the half member CM2 except the flat surface 42, thus forming the half member 14'. Then, the optical waveguide chip 2 is seated on the inner surface of the half member 12. The subplate 20 is preliminarily fixed to the upper surface of the chip 2.

In the second preferred embodiment, it is required that the upper surface of the optical waveguide chip 2 is parallel to the divided surface (bonding surface) of the half member 12. To meet this requirement, a jig 52 as shown is used. The jig 52 includes a block 56 having a curved surface 54 corresponding to the outer surface of the half member 12, a plate 58 movably provided above the block 56, two screws 60 and 62 passed through the plate 58 at its opposite end portions and threadedly engaged with the block 56, and two springs 64 and 66 respectively corresponding to the screws 60 and 62 and provided between the plate 58 and the block 56.

The screws 60 and 62 are preliminarily loosened, and the half member 12 and the optical waveguide chip 2 are inserted between the plate 58 and the block 56. In this condition, the screws 60 and 62 are tightened to thereby make the divided surface of the half member 12 and the upper surface of the chip 2 come into close contact with the lower surface of the plate 58. As a result, the parallelism between the upper surface of the chip 2 and the divided surface of the half member 12 can be obtained. In this condition, an adhesive is charged around the chip 2 to thereby fix the chip 2 to the half member 12. Thereafter, the half member 14' is integrated with the half member 12, and the adhesive is further charged into a space defined between the half members 12 and 14', thereby hermetically sealing the optical waveguide chip 2. By adopting such a fabrication process, the upper surface of the chip 2 and the flat surface 42 of the half member 14' in the chip module 36 shown in FIG. 5 can be easily made parallel to each other.

Figure 7:
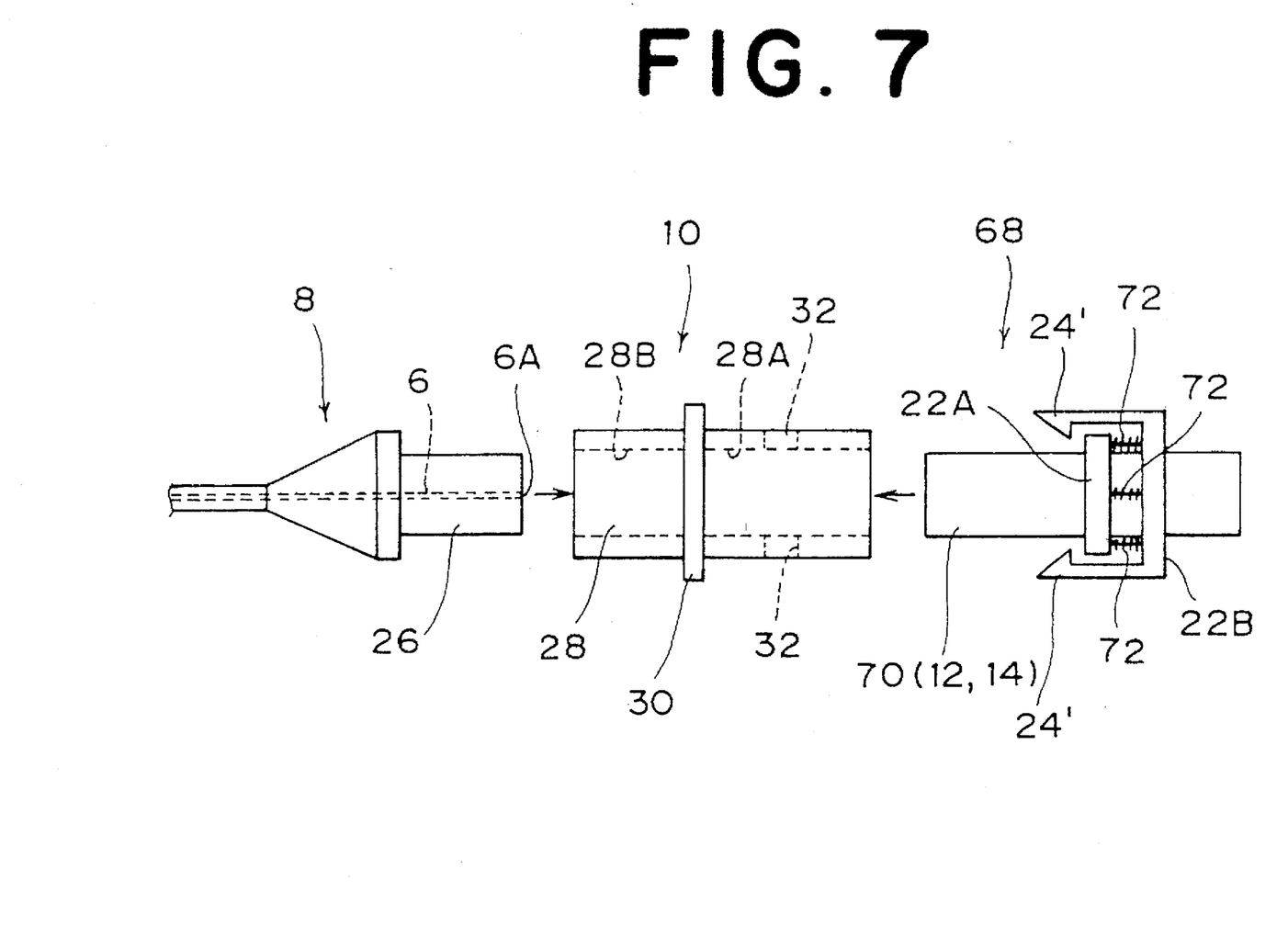
FIG. 7 is a side view of an optical waveguide device showing a third preferred embodiment of the present invention.

FIG. 7 is a side view of an optical waveguide device showing a third preferred embodiment of the present invention. This optical waveguide device has an optical fiber plug 8, an adapter 10 both identical with those shown in FIG. 1, and an improved chip module 68. In the following description, the first adapter (integrated half members 12 and 14) for holding a chip will be referred to as a module adapter, and it will be denoted by reference numeral 70. In contrast with the chip module 4 in the first preferred embodiment, the chip module 68 is characterized in that it includes a flange consisting of a fixed flange 22A and a movable flange 22B. The fixed flange 22A is a ring-shaped member, and it is fixed to the outer surface of the module adapter 70. The movable flange 22B is connected through a plurality of springs 72 to the fixed flange 22A, and is slidably mounted on the outer surface of the module adapter 70. The movable flange 22B has a pair of hooks 24' for respectively engaging the pair of openings 32 of the adapter 10.

By adopting the movable flange 22B, when the chip module 68 is mounted to the adapter 10 and the hooks 24' are engaged into the openings 32, the close contact between the chip module 68 and the optical fiber plug 8 in the adapter 10 can be improved. Similar hooks and openings may be provided on the optical fiber plug 8 and the adapter 10, so as to prevent easy disengagement of the optical fiber plug 8 from the adapter 10.

Figure 8:
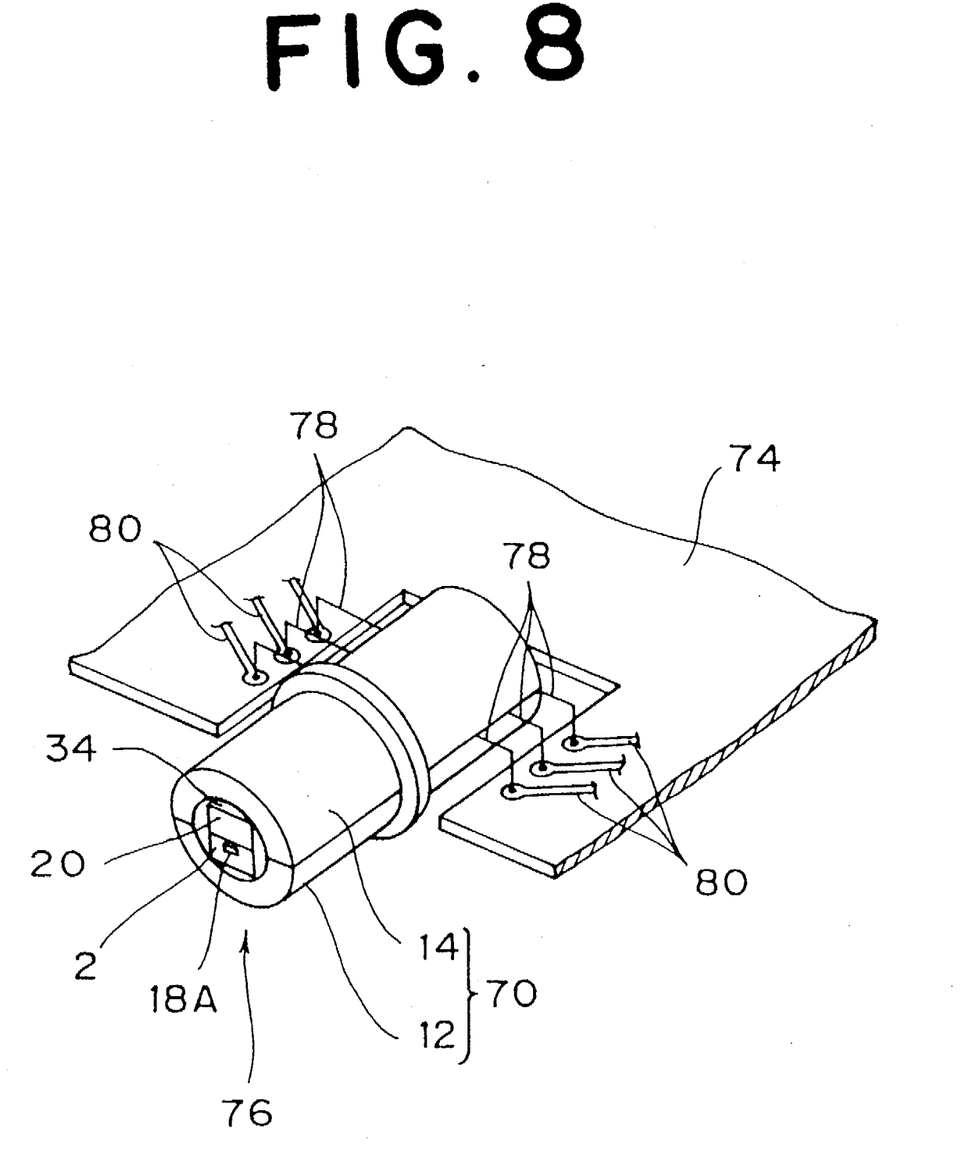
FIG. 8 is a perspective view of a part of an optical waveguide device showing a fourth preferred embodiment of the present invention.

FIG. 8 is a perspective view of a part of an optical waveguide device showing a fourth preferred embodiment of the present invention. In this preferred embodiment, a chip module 76 mounted on a printed wiring board 74 is used. The chip module 76 has a plurality of L-shaped leads 78 sandwiched between half members 12 and 14. The leads 78 are soldered at their outer ends to a plurality of conductor patterns 80 formed on the printed wiring board 74, thereby fixing the chip module 76 to the printed wiring board 74.

Figure 9:
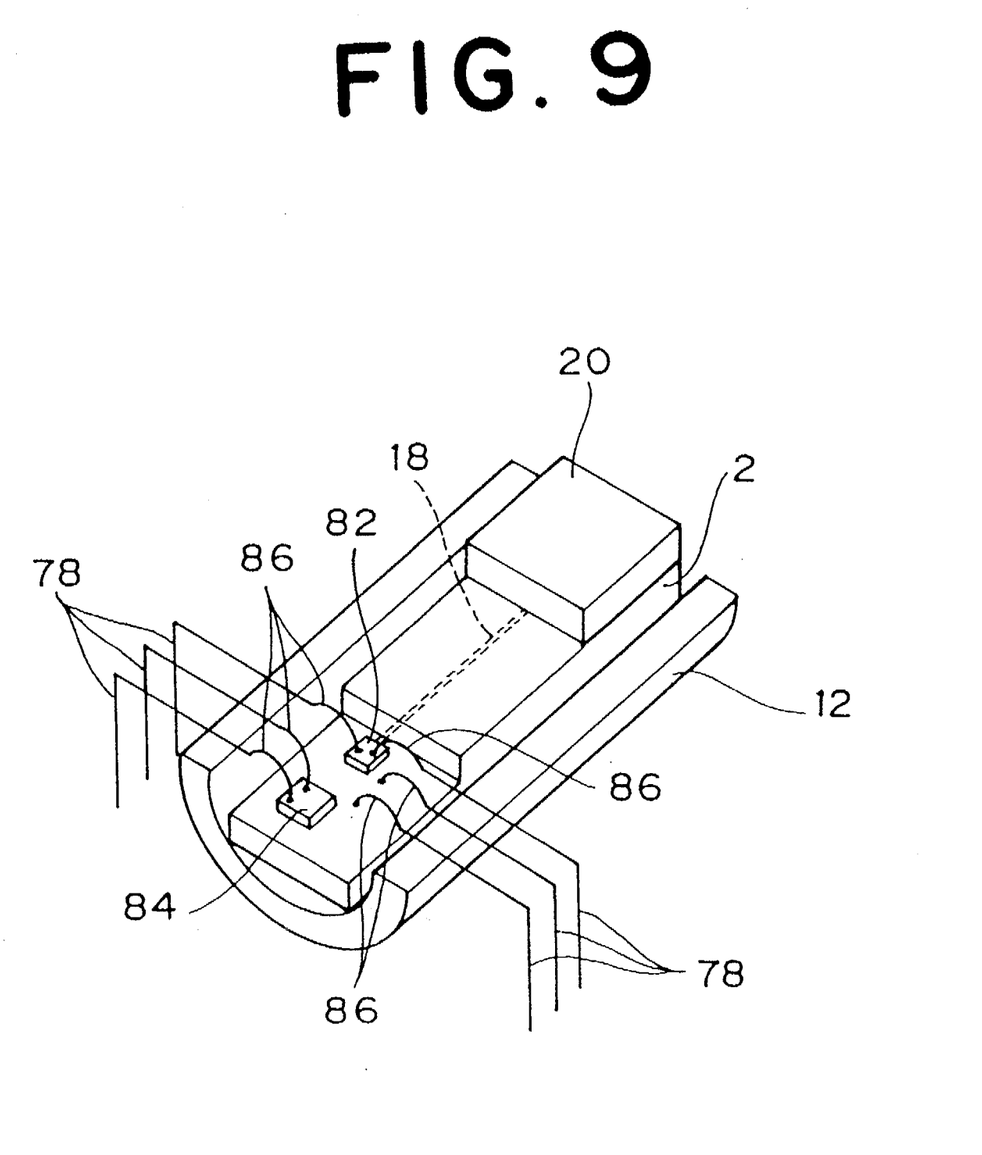
FIG. 9 is an exploded perspective view of a chip module in the fourth preferred embodiment.

Referring to FIG. 9, there is shown an exploded perspective view of the chip module 76 in the fourth preferred embodiment. That is, in FIG. 9, the half member 14 of the chip module 76 has been removed, and the remaining components are viewed from the side opposite to a subplate 20. The upper surface of an optical waveguide chip 2 is stepped to form a high-level portion and a low-level portion, in which an optical waveguide structure 18 is formed in the high-level portion, and a laser diode 82 and a photodiode 84 are provided on the low-level portion. The laser diode 82 outputs forward light and backward light, in which the forward light is supplied to the optical waveguide structure 18, and the backward light is supplied to the photodiode 84. The photodiode 84 functions to monitor an optical output from the laser diode 82. Terminals of the laser diode 82 and the photodiode 84 are connected by wire bonding through wires 86 of Au or the like to the leads 78. At least one of the bonding wires 86 is connected to a grounding pattern (not shown) formed on the optical waveguide chip 2. Ribbon bonding may be adopted instead of wire bonding.

According to the fourth preferred embodiment, in the case that an opto-electric conversion element such as a laser diode or a photodiode is provided on the optical waveguide chip, electrical connection between the element and a printed wiring board can be easily performed, and mechanical fixing of the chip module can also be easily performed. Further, in the case that such an element is provided, hermetic sealing of the chip module is preferable to obtain a stable operation of the element, and it is therefore effective to charge an adhesive 34 in the module adapter 70 (see FIG. 8). In this case, the adhesive 34 thus charged enters a gap between the laser diode 82 and the optical waveguide structure 18. Accordingly, to enhance an optical coupling efficiency between the laser diode 82 and the optical waveguide structure 18, it is desirable to make the refractive index of the adhesive cured substantially equal to the refractive index of a core of the optical waveguide structure 18.

Figure 10:
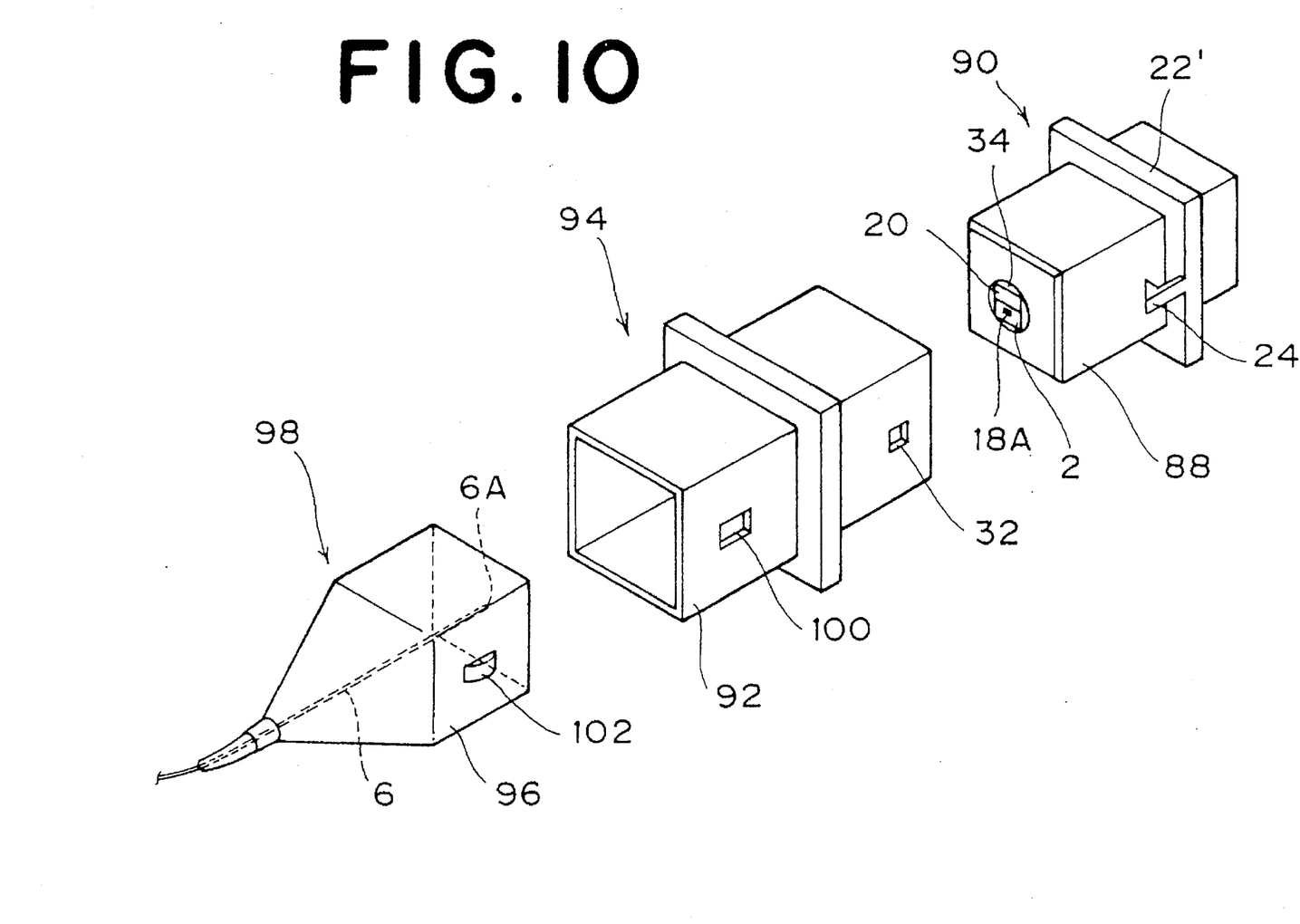
FIG. 10 is a perspective view of an optical waveguide device showing a fifth preferred embodiment of the present invention.

FIG. 10 is a perspective view of an optical waveguide device showing a fifth preferred embodiment of the present invention. This optical waveguide device includes a chip module 90 having a substantially rectangular prismatic module adapter 88, an adapter 94 having a sleeve member 92 having a shape corresponding to the shape of the module adapter 88, and an optical fiber plug 98 having a ferrule 96 having a shape corresponding to the shapes of the module adapter 88 and the sleeve member 92.

In the chip module 90, an optical waveguide chip 2 and a subplate 20 are fixed inside the module adapter 88 by an adhesive 34, and a flange 22' having a pair of hooks 24 are provided on the outer surface of the module adapter 88 as similarly to the first preferred embodiment. The module adapter 88 can be fabricated easily with a high dimensional accuracy by a method including a process of equally dividing a rectangular prismatic member into two parts as similarly to the first preferred embodiment, so the description of the fabrication method for the module adapter 88 will be omitted herein.

In the adapter 94, the sleeve member 92 has a pair of openings 32 (one of which being shown) and a pair of openings 100 (one of which being shown). When the chip module 90 is mounted to the adapter 94, the pair of hooks 24 of the flange 22' come to engagement with the pair of openings 32, respectively. Similarly, when the optical fiber plug 98 is mounted to the adapter 94, a pair of projections 102 formed on the opposite side surfaces of the ferrule 96 come to engagement with the pair of openings 100, respectively.

When both the chip module 90 and the optical fiber plug 98 are mounted to the adapter 94, the outer surface of the module adapter 88 and the outer surface of the ferrule 96 come to close contact with the inner surface of the sleeve member 92, and a connection end 18A of the chip module 90 comes to opposition to and close contact with an excitation end 6A of an optical fiber 6. Accordingly, the chip 2 and the optical fiber 6 can be optically coupled simply with low connection loss.

Figure 11:
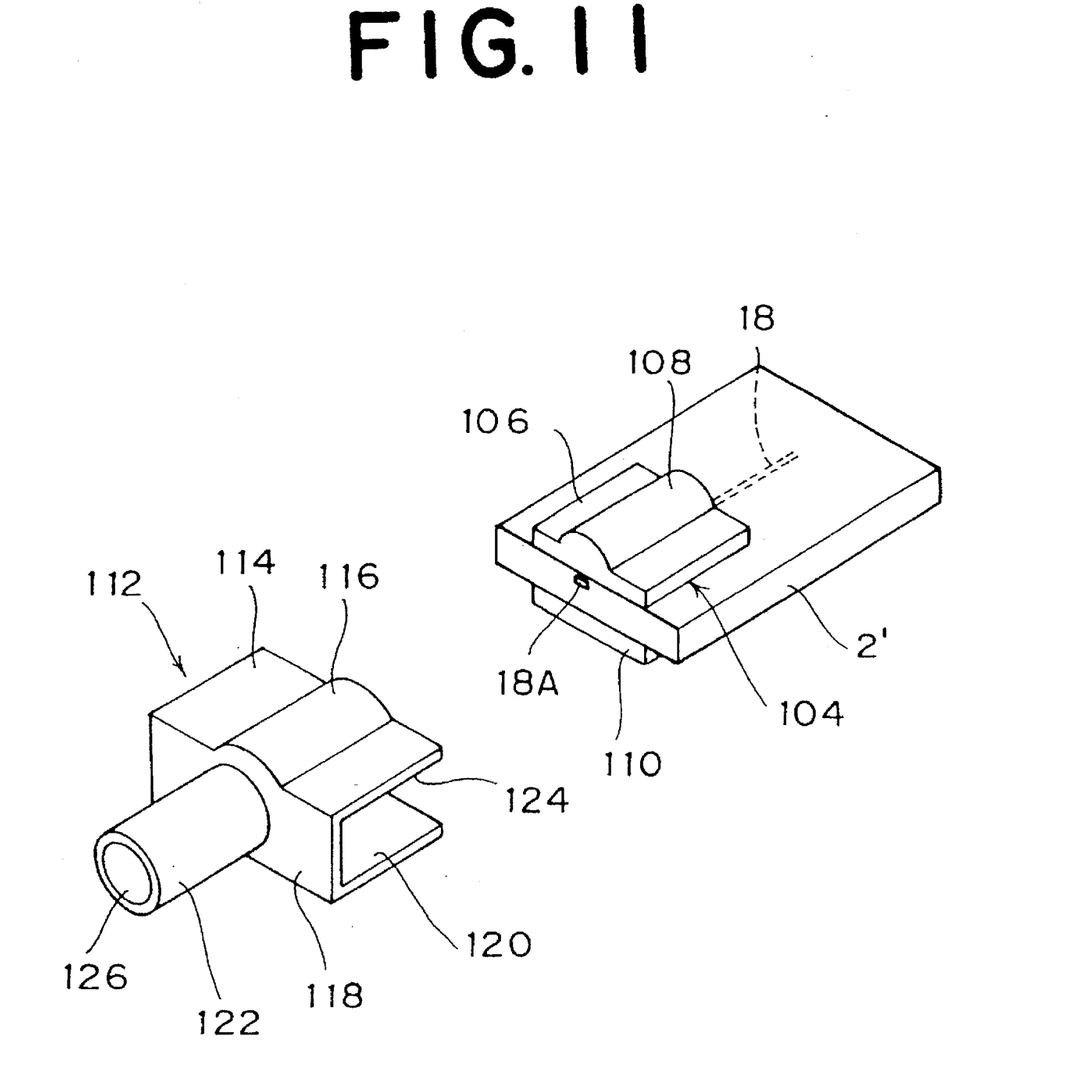
FIG. 11 is a perspective view of a part of an optical waveguide device showing a sixth preferred embodiment of the present invention.

FIG. 11 is a perspective view of a part of an optical waveguide device showing a sixth preferred embodiment of the present invention. This preferred embodiment is suitable in the case where an optical waveguide chip 2' is relatively large, and it cannot therefore be accommodated in the module adapter as used in the previous preferred embodiments.

The optical waveguide chip 2' has an optical waveguide structure 18, and a connection end (end surface) 18A of the optical waveguide structure 18 is flush with an end surface of the chip 2'. A module adapter 104 is fixed to the upper surface of the chip 2' in the vicinity of the connection end 18A so as to cover the optical waveguide structure 18. The module adapter 104 is composed of a plate 106 and a semicylindrical projection 108 formed on the upper surface of the plate 106. The plate 106 and the projection 108 are integral with each other in this preferred embodiment. The shape and mount position of the module adapter 104 are set so that the center of curvature of the projection 108 coincides with the center of the connection end 18A. A subplate 110 is fixed to the lower surface of the optical waveguide chip 2' at a position corresponding to the mount position of the module adapter 104. The thickness of the subplate 110 is set so that the sum of the distance from the center of the connection end 18A to the lower surface of the optical waveguide chip 2' and the thickness of the subplate 110 is equal to the radius of curvature of the projection 108 of the module adapter 104.

An adapter (second adapter) 112 to be detachably mounted to the module adapter 104 has an upper plate 114 corresponding to the module adapter 104. The upper plate 114 has at its substantially central portion a semicylindrical projection 116 corresponding to the projection 108 of the module adapter 104. The upper plate 114 has an inner surface (first region) 124 adapted to come into close contact with the outer surface of the module adapter 104. The adapter 112 further has a vertical plate 118 and a lower plate 120 both integral with the upper plate 114. The upper plate 114, the vertical plate 118, and the lower plate 120 form a substantially C-shaped cross section. The vertical plate 118 is integrally formed at its substantially central portion with a sleeve 122 for receiving the ferrule 26 of the optical fiber plug 8 (see FIG. 1). When the optical fiber plug 8 is mounted to the adapter 112, the outer surface of the ferrule 26 comes to close contact with an inner surface (second region) 126 of the sleeve 122.

In mounting the adapter 112 to the module adapter 104, the module adapter 104, the chip 2', and the subplate 110 are inserted between the upper plate 114 and the lower plate 120 in such a manner that the projection 108 of the module adapter 104 slides on the inner surface of the projection 116 of the adapter 112, and the end surface of the chip 2' comes to abutment against the inner surface of the vertical plate 118. Since the end surfaces of the module adapter 104 and the subplate 110 are flush with the end surface of the chip 2', the end surfaces of the members 104 and 110 also come to abutment against the inner surface of the vertical plate 118. The center line of the sleeve 122 coincides with the center of curvature of the inner surface of the projection 116. Accordingly, when the optical fiber plug 8 (see FIG. 1) is mounted to the adapter 122 mounted to the module adapter 104, the excitation end 6A of the optical fiber 6 (see FIG. 1) can be opposed to the connection end 18A. Thus, also according to this preferred embodiment, the optical waveguide chip 2' and the optical fiber 6 can be optically coupled simply with low connection loss.

In the sixth preferred embodiment, the lowermost portion of the inner surface 126 of the sleeve 122 is set so as to coincide in level with the inner surface of the lower plate 120. The reason why the subplate 110 is fixed to the lower surface of the optical waveguide chip 2' is to allow accurate positioning of the connection end 18A by finely adjusting the thickness of the subplate 110. Accordingly, the subplate 110 may be removed according to the thickness of the chip 2'.

In this preferred embodiment, accurate positioning of the module adapter 104 to the chip 2' is required because the connection end 18A is positioned by the projection 108 of the module adapter 104. Such accurate positioning can be facilitated by making corresponding marks (not shown) on the upper surface of the chip 2' and the side surfaces of the module adapter 104.

Figure 12:
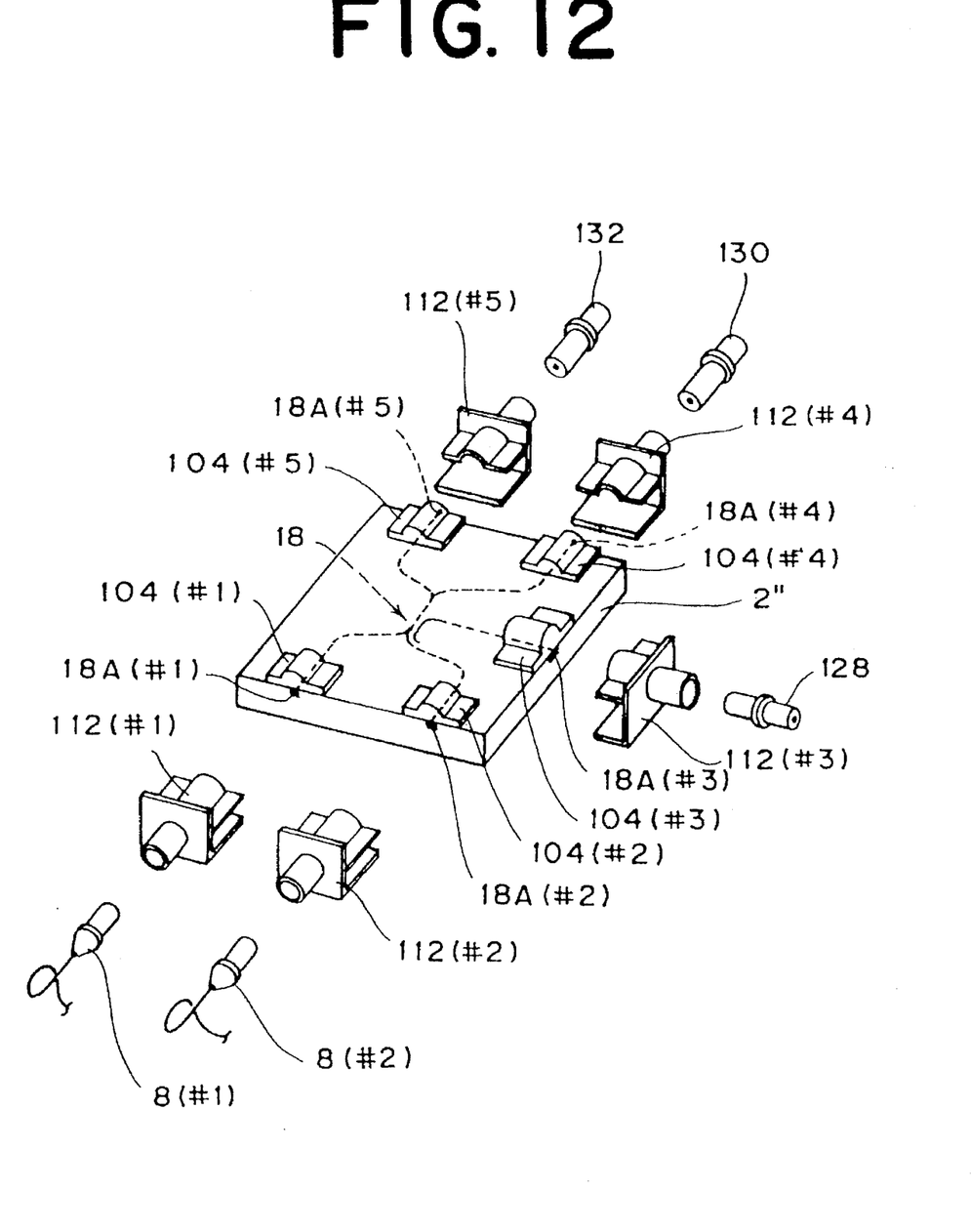
FIG. 12 is a perspective view of an optical waveguide device showing a seventh preferred embodiment of the present invention.

FIG. 12 is a perspective view of an optical waveguide device showing a seventh preferred embodiment of the present invention. In this preferred embodiment, a hybrid optical module is provided by applying the present invention.

An optical waveguide chip 2" has five connection ends 18A (#1 to #5) as five ports for light input or light output. An optical waveguide structure 18 is configured so as to mutually optically connect these five ports. Five module adapters 104 (#1 to #5) each similar to the module adapter 104 in the sixth preferred embodiment shown in FIG. 11 are fixed to the upper surface of the chip 2" at positions corresponding to the connection ends 18A (#1 to #5), respectively. Further, five adapters 112 (#1 to #5) each similar to the adapter 112 in the sixth preferred embodiment are used for adaptation to the connection ends 18A (#1 to #5), respectively.

Optical fiber plugs 8 (#1 and #2) each similar to the optical fiber plug 8 in the first preferred embodiment shown in FIG. 1 are connected to the connection ends 18A (#1 and #2), respectively. Laser diode assemblies 128, 130, and 132 are optically connected to the connection ends 18A (#3, #4, and #5), respectively. Each of the laser diode assemblies 128, 130, and 132 has a configuration similar to that of the chip module in the fourth preferred embodiment shown in FIG. 9, for example. Part or all of the laser diode assemblies 128, 130, and 132 may be replaced by a photodiode assembly or photodiode assemblies. Each photodiode assembly may be fabricated by removing the photodiode 84 in the chip module shown in FIG. 9 and replacing the laser diode 82 with another photodiode.

By applying the present invention to such a hybrid optical module, optical coupling between components can be simply performed, thereby facilitating assembling of the hybrid optical module.

As described above, according to the present invention, it is possible to provide an optical waveguide device which can optically couple an optical waveguide chip and an optical fiber simply with low connection loss.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical waveguide device comprising:

an optical waveguide chip having an optical waveguide structure having a connection end, said optical waveguide chip having an end surface flush with said connection end;

a first adapter fixed to said optical waveguide chip and having an outer surface set in predetermined positional relation with said connection end;

a second adapter having an inner surface including a first region and a second region, said second adapter being detachably mounted to said first adapter so that said outer surface of said first adapter comes to close contact with said first region; and an optical fiber plug having an optical fiber having an excitation end and a ferrule in which said optical fiber is inserted and fixed, said optical fiber plug being detachably mounted to said second adapter so that an outer surface of said ferrule comes to close contact with said second region;

wherein when said second adapter is mounted to said first adapter, and said optical fiber plug is mounted to said second adapter, said connection end of said optical waveguide structure and said excitation end of said optical fiber are optically coupled.

2. An optical waveguide device according to claim 1, wherein:

said first adapter comprises a first sleeve divided into a first half member and a second half member;

said optical waveguide chip is seated on an inner surface of said first half member; and said second adapter comprises a second sleeve having an inner diameter slightly larger than an outer diameter of said first sleeve.

3. An optical waveguide device according to claim 2, further comprising:

an adhesive charged in a space defined between said first half member and said second half member, for hermetically sealing said optical waveguide chip.

4. An optical waveguide device according to claim 2, wherein:

said outer surface of said first adapter, said inner surface of said second adapter, and said outer surface of said ferrule are formed so as to determine a rotational position of said optical fiber plug relative to said optical waveguide chip.

5. An optical waveguide device according to claim 4, wherein:

said optical fiber comprises a polarization-maintaining fiber having a principal axis;

said polarization-maintaining fiber transmitting linearly polarized light having a polarization plane parallel or perpendicular to said principal axis and maintaining said polarization plane.

6. An optical waveguide device according to claim 5, wherein said optical waveguide chip has an upper surface parallel or perpendicular to said principal axis.

7. An optical waveguide device according to claim 1, further comprising:

an opto-electric conversion element optically connected to said optical waveguide structure; and a lead for connecting said opto-electric conversion element to an external circuit.

8. An optical waveguide device according to claim 7, wherein:

said external circuit comprises a conductor pattern formed on a printed wiring board;

said lead being connected to said conductor pattern, thereby fixing said first adapter to said printed wiring board.

9. An optical waveguide device according to claim 1, wherein said outer surface of said first adapter and said outer surface of said ferrule are rectangular prismatic in shape.

10. An optical waveguide device according to claim 1, wherein said first adapter comprises:

a plate fixed to said optical waveguide chip so as to cover said optical waveguide structure in the vicinity of said connection end; and a semicylindrical projection formed on said plate; said plate and said projection being integral with each other.

11. An optical waveguide device according to claim 1, wherein:

said connection end comprises a plurality of connection ends; and said first adapter, said second adapter, and said optical fiber plug comprise a plurality of first adapters, a plurality of second adapters, and a plurality of optical fiber plugs, respectively, so as to correspond to said plurality of connection ends.

* * * * *